United States Patent [19]

Weber

[11] 4,280,303

[45] Jul. 28, 1981

[54] PLASTIC PELLET CLEANING APPARATUS AND METHOD FOR OPTICAL LENSE MOLDING

[76] Inventor: Hermann Weber, 5506 Beckford Ave., Tarzana, Calif. 91356

[21] Appl. No.: 145,821

[22] Filed: May 1, 1980

[51] Int. Cl.³ .............................................. B24B 31/00
[52] U.S. Cl. ..................................... 51/163.1; 51/313; 264/162
[58] Field of Search ............... 264/162; 51/163.1, 313, 51/7

[56] References Cited

U.S. PATENT DOCUMENTS

| Re. 22,358 | 8/1943 | Arpin | 264/162 X |
|---|---|---|---|
| 121,847 | 12/1871 | Chichester | 51/163.1 X |
| 3,187,473 | 6/1965 | Ruppe | 51/313 |

Primary Examiner—Harold D. Whitehead
Attorney, Agent, or Firm—Blakely, Sokoloff, Taylor & Zafman

[57] ABSTRACT

A plastic pellet cleaning apparatus and method for producing plastic pellets for optical lense molding is provided. The plastic is melted and molded utilizing an injection molding process to produce optical lenses which will be used for a variety of applications. The apparatus and method disclosed will produce plastic pellets substantially clean of contaminants which would otherwise cause microscopic defects in the optical lenses produced therefrom. Generally, optical lenses produced which have these defects are rejected.

11 Claims, 3 Drawing Figures

PLASTIC PELLET CLEANING APPARATUS AND METHOD FOR OPTICAL LENSE MOLDING

BACKGROUND OF THE INVENTION

1. Field of the Invention

The invention relates to the field of pre-processing of plastic for injection molding of plastic lenses.

2. Prior Art

Polycarbonate (e.g. Merlon or Lexan) is used for the injection molding of plastic lenses, including prescription lenses. It has generally been accepted that a relatively high percentage of lenses so produced will be rejected as having defects in the form of contaminants (particles) molded into the lenses. By properly cleaning the polycarbonate, a marked decrease in the percentage of defective lenses can result.

The polycarbonate, after extrusion is typically cut into pellets of less than ⅛ inch long by the plastics manufacturer. It is generally purchased in this form and then melted. The pellets have burrs on their ends as a result of the cutting process.

The melting of polycarbonate requires a high temperature. The burrs (because of their smaller surface area) tend to burn as the pellets melt. These burned or blackened burrs show up as defects in the optical lenses. (This problem is not generally recognized in the industry as a cause of defects in lenses.) It should also be noted that in addition to the burrs, various foreign matter melted with the pellets cause defects if the pellets are not properly cleaned.

It is known in the prior art to clean the pellets (with for example, a commercial feed grain cleaner) prior to melting them. However, this cleaning has not been particularly effective. For one reason, unless the burrs are disassociated from the pellets, they cannot be removed by the cleaning process.

As will be seen, the present invention provides a method and apparatus for cleaning the pellets which removes the burrs. Moreover, the invented method and apparatus provides a more thorough removal of other contaminants from the pellets.

SUMMARY OF THE INVENTION

An apparatus and method for preparing plastic pellets for use in optical lense molding is described. The plastic pellets are removed from a bin or the like by a screw or helical lift to impart mechanical action to the pellets. This mechanical action breaks off the burrs from the pellets. The burrs, although not integral with the pellets after the mechanical action, are nevertheless very difficult to separate from the plastic pellets because the mechanical action causes a static charge in the pellets, and thus the burrs "stick" to the pellets. This static charge also makes it more difficult to remove other contaminants from the pellets.

The novel approach disclosed by this invention is to pass the plastic pellets through an ionized field as the pellets are passed into an air scalper for cleaning. For example, a "HERBERT IONIZER" blows ionized air onto the plastic pellets thereby removing the static charge. Alternatively, the pellets are dropped through a radioactive ring such as the 3M type 210 anti-static device.

In the preferred embodiment, a second anti-static device is used within the air scalper to further reduce static electricity.

DETAILED DESCRIPTION OF THE INVENTION

An apparatus and method are described for plastic pellet cleaning for optical lense molding. The apparatus and method will be described as presently implemented. However, it will be obvious to one skilled in the art that the apparatus and method taught are applicable to other configurations of available air cleaning devices coupled with mechanisms for providing an anti-static field.

Figure 1:
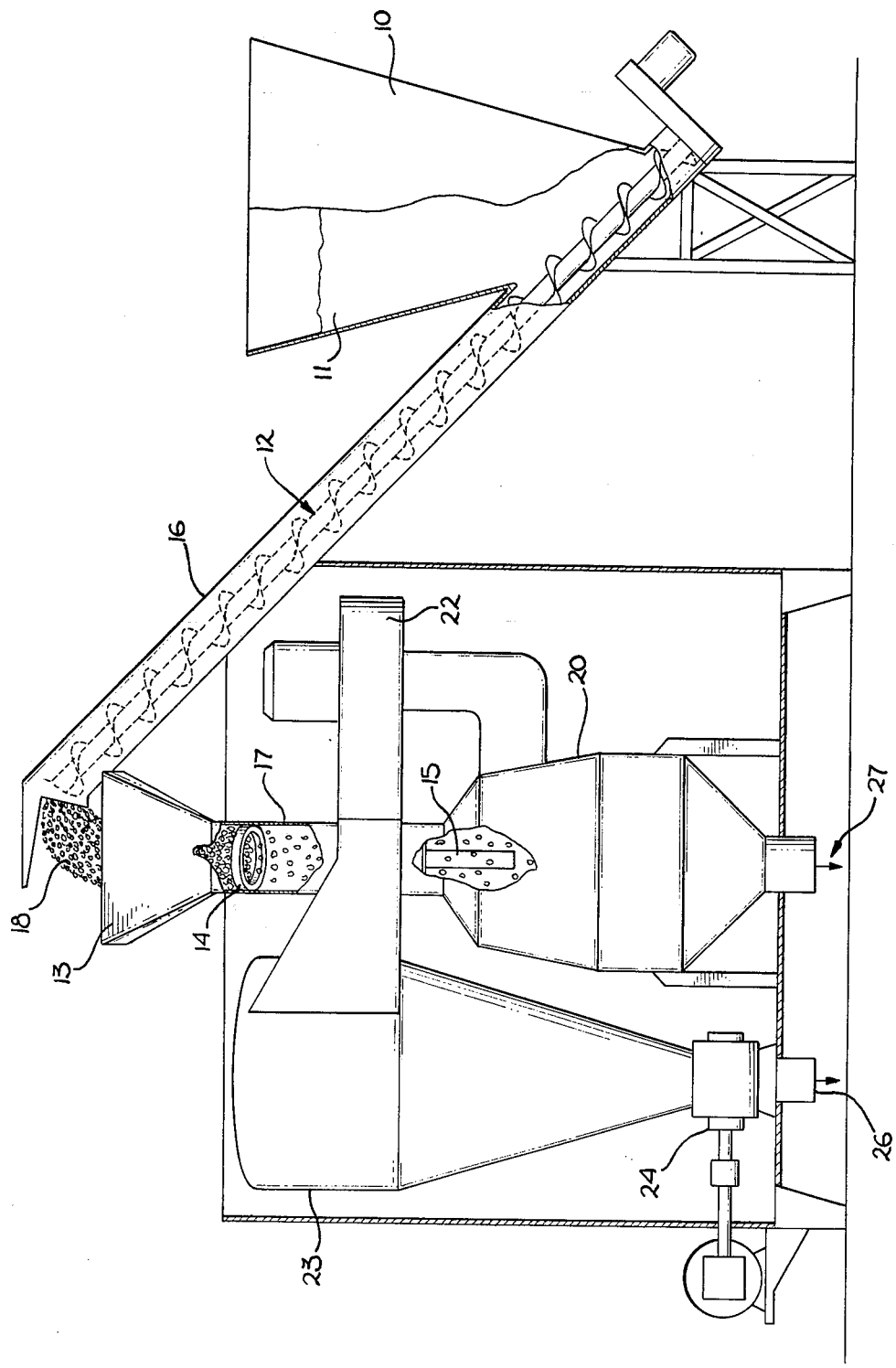
FIG. 1 is an elevation view of a lifting device and air scalper with the improvement of the present invention.

FIG. 1 indicates generally an air cleaning apparatus 20 with other components typically used in conjunction therewith. The particles to be cleaned are stored in a cone shaped bin 10. The bin tapers downward whereby particulate material to be cleaned contained therein is guided toward a screw lift 12. The screw is within a shaft 16 and the screw rotates such that the particles in contact with the screw are lifted up the shaft 16. The particles exit the end of the shaft 16 away from the bin 10. This exit is positioned above the air cleaning apparatus 20 such that gravity causes the particles to drop into the air cleaning apparatus 20. The contaminants thereby removed from the particles are themselves removed from the air cleaning apparatus 20 by a vacuum created by a centripetal air reclaimer 25 adjacent to the air cleaning apparatus 20. A more detailed description of the operation of these components appears hereinbelow.

Figure 2:
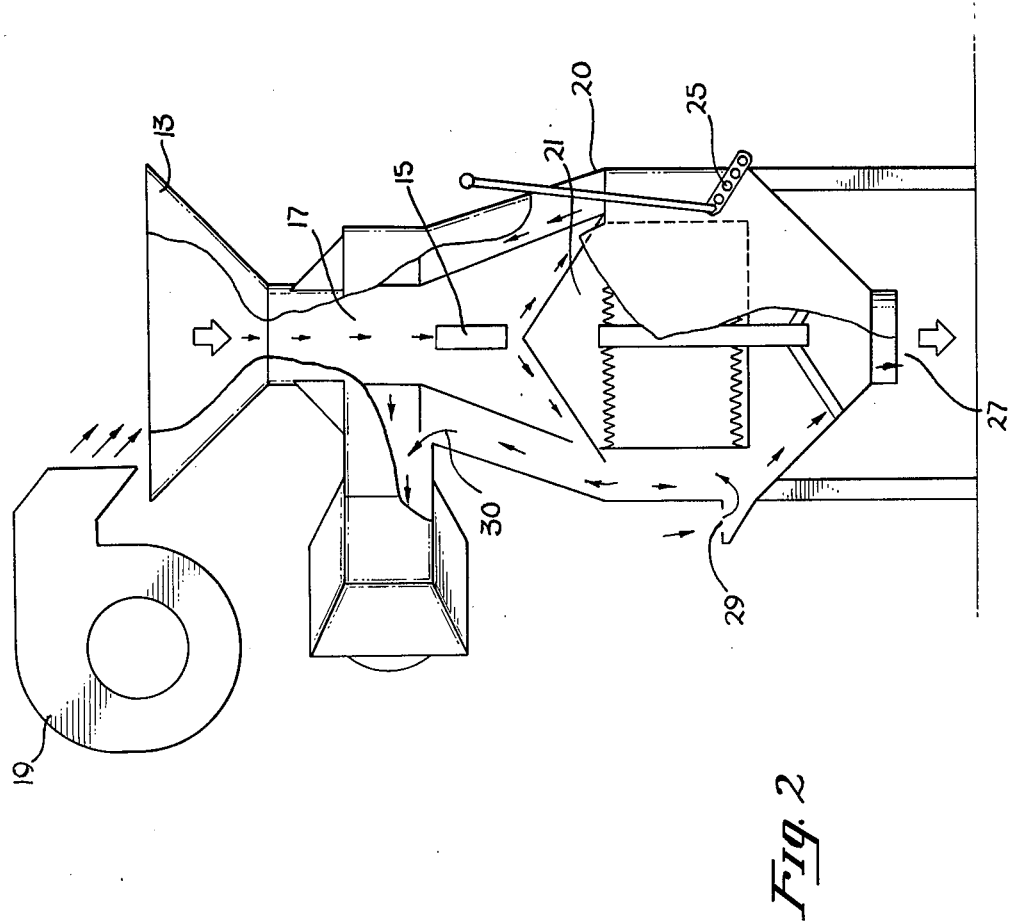
FIG. 2 is a partial cutaway view of an air scalper which includes the anti-static device of the present invention.

FIG. 2 is a cut away view of a typical air cleaning apparatus 20 or air scalper. Additionally, there is an ionized air blower 19 displayed which would be mounted to the air scalper 20 as needed to insure that the ionized air produced by the blower 19 is directed into the air scalper 20. Furthermore, the bin 10, screw lift 12, shaft 16 and centripetal air reclaimer 25 of FIG. 1 are not shown in FIG. 2 to avoid needless repetition. However, in normal operation these additional components would be present.

Figure 3:
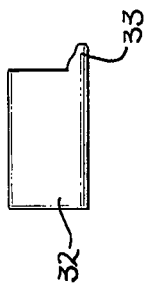
FIG. 3 is a plan view of a typical plastic pellet with integral burr.

A single plastic pellet 32 with burr 33 is depicted in FIG. 3. In addition to the undesirable burrs, a static charge, created by rubbing action of the pellets, attracts and holds contaminants. As shown by FIG. 1 the raw plastic pellets with burrs and contaminants 11 stored in bin 10 are transported up shaft 16 by the screw or helical lift 12. The mechanical action created by this screw lift as the pellets are lifted up shaft 16 removes the sharp edges and burrs from the pellets. Thus when the plastic pellets have completed their path up the shaft, substantially deburred plastic pellets 18 are provided as input to the pellet cleaning device described hereinbelow.

At this point the deburred plastic pellets and contaminants enter the pellet cleaning device 20 which is a modified air scalper, typically used to clean feed grain. A typical air scalper as shown in FIG. 2 is comprised of the following components: a raw material inlet 13, a shaft 17, a floating cone 21, a clean out control rod 25, a clean air inlet 29 and a fan unit 22. A brief description of the operation of an air scalper prior to implementing the modifications taught by this invention follows.

The raw material drops by gravity from the raw material inlet 13 down shaft 17 at the bottom of which the floating cone 21 spreads the falling material. This produces a constant flow of the material past the clean air inlet 29 thereby insuring that all of the material has adequate contact with the air cleaning mechanism. The air scalper produces an air current which enters the clean air inlet 29 creating an updraft. This air updraft blows the lighter material up the pathway 30, but the heavier material continues to fall down the pathway 28. The vacuum created by the fan unit 22 withdraws the lighter material from the air scalper.

Referring back to FIG. 1 these lighter particles are extracted by a cyclone 23, which is a centripetal air reclaimer. The cyclone is comprised of a rotary air lock 24 and a foreign material outlet 26. The material extracted by the cyclone is deposited at the foreign material outlet 26. The particles which are not extracted by the cyclone, continue their path down the pathway 28 and are deposited at the clean material outlet 27. The rate at which the clean particles are deposited is controlled by the clean out control rod 25.

The air scalper, as mentioned and described, is a commercially available device commonly used to clean feed grain. Unfortunately, when this apparatus is utilized to clean plastic pellets, the static charge on the pellets creates an attraction force which is stronger than the separation force produced by the air scalper. Unless this static charge is removed, the effectiveness of cleaning plastic pellets with an air scalper or similar device is extremely limited.

In accordance with the present invention, in addition to the prior art air cleaning mechanism just described, an apparatus and method for removing the static charge on the plastic pellets must be included in order to produce an adequate cleaning of the plastic pellets.

The additional components used to provide the static charge removal are shown in FIG. 2 as the ionized air blower 19 and radioactive anti-static bar 15, and in FIG. 1 as the radioactive anti-static ring 14, and the radioactive anti-static bar 15.

In the preferred embodiment (referring to FIG. 2) the ionizing air blower 19, for example a "Herbert Ionizer," blows ionized air on the pellets as they enter the air scalper. The anti-static bar 15 is disposed at the bottom of the shaft 17 just above the tip of the floating cone 21. The ionizing air blower 19 produces an anti-static cloud or field in the raw material inlet 13. This anti-static field removes the static charge from the pellets as they pass through it. The anti-static cloud is a field of ionized air which strips the excess electrons from the atoms of the plastic pellets, the excess electrons being the cause of the static charge and the resultant "sticking" of the burrs and contaminants to the pellets.

After the static charge is removed from the pellets by the action of the ionized air blower 19 at the top of the shaft 17, the pellets continue to fall down the shaft 17. As the pellets fall they rub against one another thereby creating a second static charge. The ionizing bar 15 at the bottom of the shaft removes this second static charge by creating a second anti-static field through which the pellets pass.

A second embodiment of the invention involves the replacement of the ionizing air blower 19, with an anti-static ring 14 which is disposed within the shaft 17. The ring replaces the ionizing air blower 19, but creates the same anti-static cloud or field through which the pellets pass. In a third embodiment wherein either the ionizing air blower or the anti-static ring is utilized, the anti-static bar 15 at the bottom of the shaft is not used. The anti-static bar 15 is not needed in applications wherein the second static charge on the pellets as they pass through the shaft 17 creates an attraction force which is sufficiently less powerful than the separation force produced by the air scalper.

Thus an apparatus and method have been disclosed for plastic pellet cleaning for optical lense molding. The plastic pellets have burrs removed from them by mechanical action and the pellets and the burrs are placed into a device which provides anti-static fields for freeing the burrs from the pellets. An air separation or cleaning technique is utilized to remove the lighter burrs, which are undesirable, from the desired plastic pellets. The cleaned plastic pellets yield a high percentage of finished optical lenses which do not have defects caused by contaminants in the molten plastic from which the lenses are made.

It is expressly understood that there may be many different configurations under which the anti-static ring and/or ionization air blower and/or anti-static bar may be disposed within the air scalper unit without affecting the scope of the invention disclosed.

I claim:

1. An apparatus for preparing plastic pellets for optical lense molding comprising:
    (a) mechanical action means for imparting mechanical action to said plastic pellets to dislodge burrs on said pellets;
    (b) ionization means for removing static charge from said plastic pellets coupled to receive said plastic pellets from said mechanical action means;
    (c) air separating means for removing said burrs from said plastic pellets coupled to receive said plastic pellets from said ionization means;
    whereby said plastic pellets are provided which are substantially free of said burrs.

2. The apparatus defined by claim 1 wherein said ionization means is an ionized air blower.

3. The apparatus defined by claim 1 wherein said ionization means is an anti-static ring.

4. The apparatus defined by claim 1 wherein said air separating means includes a second ionization means for providing additional static charge removal from said plastic pellets.

5. The apparatus defined by claim 4 wherein said second ionization means is an anti-static bar.

6. The apparatus defined by claim 1 wherein said mechanical actions means is a helical lift.

7. The apparatus defined by claim 1 wherein said air separating means is an air scalper device for feed grain cleaning.

8. In an air cleaning device for cleaning plastic pellets for injection molding of optical lenses, an improvement comprising;
    (a) a bin for holding said pellets;
    (b) means for removing said pellets from said bin and delivering said pellets to said air cleaning device;
    (c) mechanical action means coupled to said removing means for imparting mechanical action to said pellets to dislodge burrs on said pellets;
    (d) ionization means for removing static charge from said pellets;
    whereby said pellets are provided which are substantially free of said burrs.

9. The air cleaning device defined by claim 8 wherein said air cleaning device further comprises a second ionization means for providing additional static charge removal from said plastic pellets.

10. A method for preparing plastic pellets with burrs for optical lense molding comprising the steps of:
   (a) applying mechanical action to said plastic pellets to dislodge said burrs;
   (b) generating a first ionization field to remove static charge from said plastic pellets;
   (c) blowing air past said plastic pellets to remove said burrs from said plastic pellets;
   whereby said plastic pellets substantially free of said burrs are provided.

11. The method defined by claim 10 including generating a second ionization field to provide additional static charge removal from said plastic pellets.

* * * * *